United States Patent [19]
Suzuki

[11] Patent Number: 5,805,778
[45] Date of Patent: Sep. 8, 1998

[54] DMA CONTROLLER FOR DMA TRANSFERRING IMAGE DATA FOR ONE PAGE WITHOUT INCREASING A BURDEN ON A CPU

[75] Inventor: Takao Suzuki, Isehara, Japan

[73] Assignee: Ricoh Company, Ltd., Tokyo, Japan

[21] Appl. No.: 541,693

[22] Filed: Oct. 10, 1995

[30] Foreign Application Priority Data

Oct. 7, 1994 [JP] Japan ................................ 6-268137

[51] Int. Cl.$^6$ .............................. H04N 1/32; G06F 15/00
[52] U.S. Cl. ......................... 395/115; 395/116; 395/842; 395/843; 395/846; 358/444; 358/468
[58] Field of Search .................... 358/444, 468; 395/115, 116, 842, 848, 843, 845, 846, 868, 513, 516

[56] References Cited

U.S. PATENT DOCUMENTS

| | | | |
|---|---|---|---|
| 4,079,455 | 3/1978 | Ozga | 364/200 |
| 4,479,179 | 10/1984 | Dinwiddie, Jr. | 395/115 |
| 4,797,851 | 1/1989 | Suzuki | 395/846 |
| 4,967,274 | 10/1990 | Sonoda | 395/846 |
| 5,005,121 | 4/1991 | Nakada et al. | 395/843 |
| 5,530,901 | 6/1996 | Nitta | 395/842 |
| 5,535,417 | 7/1996 | Baji et al. | 395/842 |
| 5,561,816 | 10/1996 | Mitsuhira et al. | 395/842 |
| 5,561,821 | 10/1996 | Gephardt et al. | 395/848 |
| 5,590,377 | 12/1996 | Smith | 395/842 |
| 5,613,162 | 3/1997 | Kabenjian | 395/842 |

Primary Examiner—Edward L. Coles, Sr.
Assistant Examiner—Mark Wallerson
Attorney, Agent, or Firm—Oblon, Spivak, McClelland, Maier & Neustadt, P.C.

[57] ABSTRACT

A DMA transfer controller for DMA transferring one page of image data without increasing a burden on a CPU is provided with address holders for holding addresses for each of a plurality of DMA channels. An address selector selects an address for an operating DMA channel and an address adding value prescriber prescribes an address adding value at an arbitrary value. An address adding value selector selects an address adding value between prescribed address adding values and a fixed adding value and an address adder adds such an address adding value to an output address value. A latch address selector selects an initial address value when initializing a DMA transfer and an address value produced after an address adding value has been added for providing such an address to address holders when DMA transfer is started.

17 Claims, 9 Drawing Sheets

FIG. 4A  LATCH ADDRESS SELECTOR SWITCHING SIGNAL

FIG. 4B  LATCH ADDRESS SELECTOR OUTPUT

FIG. 4C  CH 1 LATCHING SIGNAL

FIG. 4D  CH 2 LATCHING SIGNAL

FIG. 4E  CH N LATCHING SIGNAL

FIG. 5A ADDRESS SELECTOR SWITCHING SIGNAL
FIG. 5B ADDRESS SELECTOR OUTPUT
FIG. 5C OUTPUT ADDRESS LATCHING SIGNAL
FIG. 5D OUTPUT ADDRESS
FIG. 5E LATCH ADDRESS SELECTOR SWITCHING SIGNAL
FIG. 5F LATCH ADDRESS SELECTOR OUTPUT
FIG. 5G CH 1 LATCHING SIGNAL
FIG. 5H CH 2 LATCHING SIGNAL
FIG. 5I CH N LATCHING SIGNAL
FIG. 5J DMA OPERATING CHANNEL

FIG. 6

| OPERATING CHANNEL | ADDING VALUE SWITCHING SIGNAL |
|---|---|
| CH 1 | SELECT PRESCRIBER A ( +4 ) |
| CH 2 | SELECT PRESCRIBER B ( +10 ) |
| CH 3 | SELECT PRESCRIBER A ( +4 ) |
| OTHER CHANNELS | SELECT FIXED VALUE ( +1 ) |

FIG. 8

| OPERATING CHANNEL | OTHER CONDITIONS | ADDING VALUE SWITCHING SIGNAL |
|---|---|---|
| CH 1 | FOR (10n+1)th TRANSFER CYCLES | SELECT PRESCRIBER B ( +10 ) |
| | FOR OTHER CYCLES | SELECT PRESCRIBER A ( +4 ) |
| CH 2 | ------- | SELECT PRESCRIBER B ( +10 ) |
| CH 3 | ------- | SELECT PRESCRIBER A ( +4 ) |
| OTHER CHANNELS | ------- | SELECT FIXED VALUE ( +1 ) |

DMA CONTROLLER FOR DMA TRANSFERRING IMAGE DATA FOR ONE PAGE WITHOUT INCREASING A BURDEN ON A CPU

BACKGROUND OF THE INVENTION

1. Field of the Invention

The invention relates to a DMA (direct memory access) controller for controlling a DMA transfer of image data between a peripheral equipment and a storage device, and more particularly to a DMA controller suitable for use in a facsimile apparatus.

2. Discussion of the Background

DMA transfer is a technology for transferring one block of data at a high speed without involving a central processing unit (CPU). In a facsimile apparatus, such one block of data for transfer could be image data for one line of a primary scanning direction or a block of 1K bytes as described in Tokukaihei 2-270077. Image data in such a block are written in consecutive addresses and therefore can be accessed for transfer consecutively by adding a fixed value to an initial address and following consecutive addresses. Such a fixed value for adding, as an example, could be 1 in a case a data bus is 8 bits and 2 in a case a data bus is 16 bits.

However, as an operating speed of a facsimile apparatus becomes faster, there is a need to make image data for one page as one block for transfer, instead of making image data for one line as one block. When transferring image data for one page, there occurs such necessities as eliminating unnecessary data or skipping over data at a certain interval. For example, in a case that a width of a document scanned for transmitting is narrower than a maximum scanning width of the apparatus, it becomes necessary to eliminate unnecessary data (the portion not corresponding to the scanned document) when transmitting since the apparatus normally scans with its maximum width. Another example is that scanned data needs to be skipped over at a certain interval in a primary scanning direction as well as in a sub-scanning direction when transmitting in a case that a size of an image to be transmitted needs to be reduced to match a capability of a receiving apparatus.

It is possible to eliminate unnecessary data or skip over data at a certain interval when DMA transferring by a method described in Tokukaihei 5-67305. In this example, data to be transferred is divided beforehand by a CPU into small blocks each of which has a fixed value to be added to address values to produce an address to be accessed next, and an array table containing the first address for each block, a number of data to be transferred in each block and so forth is made. And, transfers of each block of data are performed referring to such an array table. Therefore, with this method, the CPU has to be involved in providing reference data for each line contained in a page.

As described above, as an operating speed of scanning and recording becomes faster in recent facsimile apparatus, it becomes necessary to transfer image data for one page at a high speed without involving a CPU. However, it is impossible to DMA transfer image data for one page if an address adding value is fixed. Namely, there exists a problem in that it is impossible to skip data at a certain interval in primary scanning or sub-scanning directions or to eliminate unnecessary data when DMA transferring image data for one page as one block. Also, there exists a problem in that a burden on a CPU is increased in a case that a table for prescribing details of extracting and skipping data needs to be made for performing a DMA transfer of image data for one page.

SUMMARY OF THE INVENTION

Accordingly, the present invention has been made in view of such problems and therefore one object of the present invention is to provide a novel DMA controller which is capable of DMA transferring image data for one page without increasing a burden on a CPU.

A further object of the present invention is to provide a novel facsimile apparatus which is equipped with such a novel DMA controller.

In order to achieve the above-mentioned objects, a DMA controller for controlling a DMA transfer of image data between a peripheral equipment and a storage device, according to the present invention, includes a device for generating an address for each DMA channel by consecutively adding a value which has been prescribed beforehand to an initial address value and following consecutive address values and a device for prescribing the address adding values.

The DMA controller according to the present invention as mentioned above further includes a device for switching the address adding value between a fixed adding value prescribed beforehand and an arbitrary adding value prescribed by the address adding value prescribing device.

In a case that plural devices for prescribing such address adding values are provided, the address adding value switching device switches among such plural address adding value prescribing devices for selecting the address adding value.

Such switching of the address adding value mentioned above is made for each operating DMA channel according to the present invention. And further, such switching is made every time when a transfer of a certain volume of data has been completed according to the present invention.

Further, a facsimile apparatus according to the present invention which is equipped with a DMA controller for controlling a DMA transfer of image data between a peripheral equipment and a storage device without involving a CPU includes a device for generating addresses for each DMA channel by consecutively adding a value which has been prescribed beforehand to an initial address value and following consecutive address values, a device for prescribing an address adding value and a device for switching the address adding value between the fixed value prescribed beforehand and a value prescribed by the address adding value prescribing device, so that image data for one page can be DMA transferred as one block for transfer.

As described above, any value can be prescribed as an address adding value at the address adding value prescribing device with the DMA controller according to the present invention. Therefore, it becomes possible to skip data at a certain interval in a primary scanning direction when DMA transferring image data for one page.

Further, as described above, an address adding value can be switched by the address adding value switching device between a fixed value, such as 1 normally used and a value prescribed by the address adding value prescribing device with the DMA controller according to the present invention. Therefore, it becomes possible, for example, to extract a portion corresponding to a B4 width from an A3 width image data when transmitting. Further, it is possible to skip over data at a certain interval in a sub-scanning direction.

Further, as described above, an arbitrary address adding value can be prescribed at each address adding value prescribing device and an address adding value is switched among such values by the address adding value switching device. Therefore, it becomes possible to select for each DMA transfer an appropriate address adding value depending upon the sizes of a transmitting image and a printing paper. It is also possible to skip data at a certain interval in both primary scanning and sub-scanning directions.

Further, as described above, an address adding value is switched for each operating DMA channel according to the present invention. Therefore, a DMA channel for decompressing an image data and a DMA channel for transferring such decompressed data to another location can be operated at the same time with different address adding values.

Further, since such switching is made every time when a transfer of a certain volume of data is completed according to the present invention, it is possible to extract the portions corresponding to a B4 width from an A3 width image data when transferring. Also, it is possible to skip data at a certain interval in both primary scanning and sub-scanning directions.

Further, as described above, with the facsimile apparatus equipped with the DMA controller according to the present invention, it is possible to perform a DMA transfer of image data for one page as one block without increasing a burden on a CPU.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Referring now to the drawings, wherein like reference numerals designate identical or corresponding parts throughout the several views, an embodiment of the present invention is explained.

Figure 1:
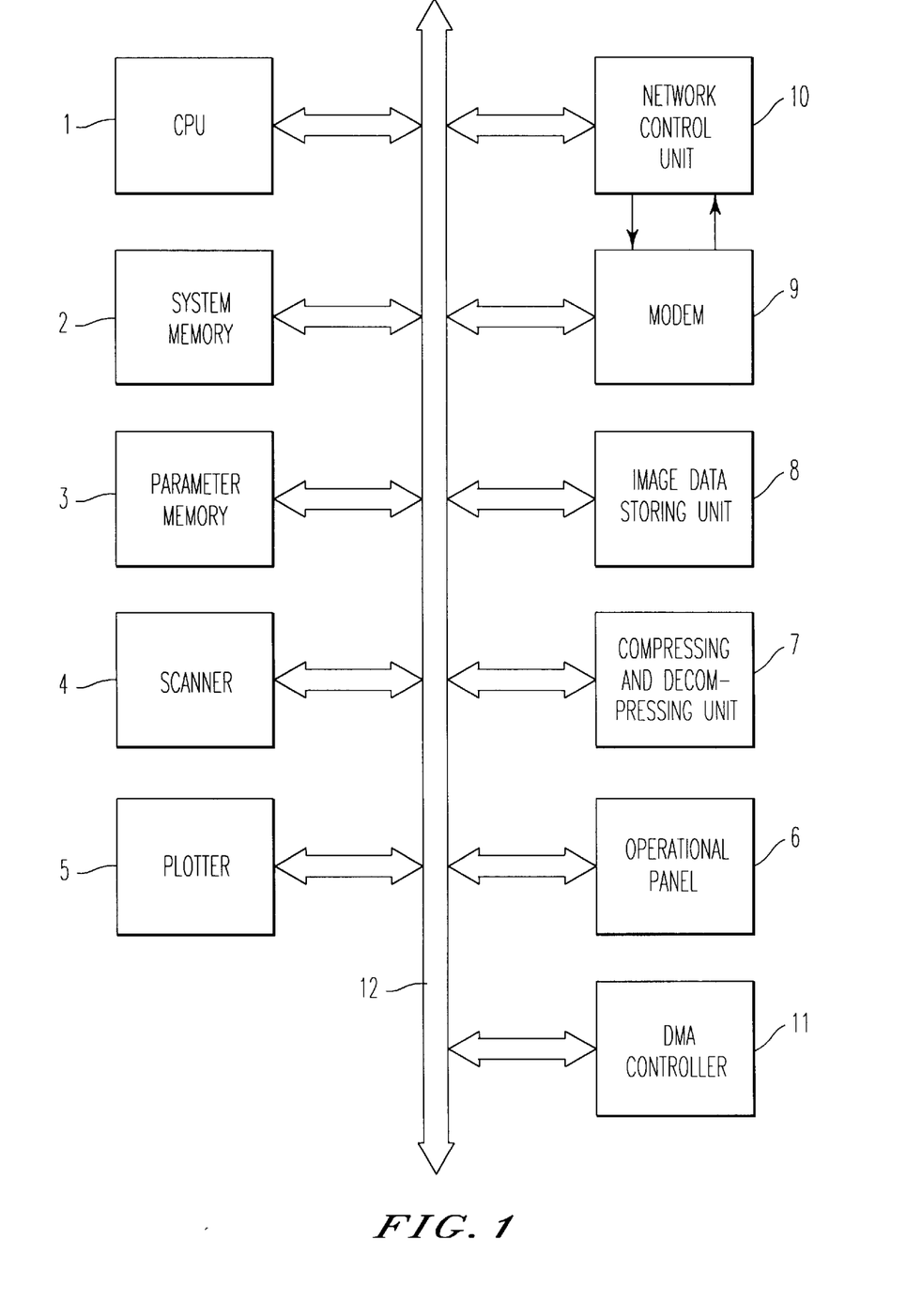
FIG. 1 is a block diagram of a facsimile apparatus in accordance with a first embodiment of the present invention.

FIG. 1 is a block diagram illustrating a facsimile apparatus according to the present invention. In FIG. 1, numeral 1 denotes a CPU which controls operations of various parts of the apparatus and a protocol of facsimile transmissions and numeral 2 denotes a system memory which stores control programs the CPU 1 executes and various data required for executing such control programs. The system memory 2 also provides a work area for the CPU 1. Numeral 3 denotes a parameter memory for storing various information peculiar to, as an example, a G3 facsimile apparatus. Numeral 4 denotes a scanner which is an image reading device which reads image data by scanning with a prescribed resolution and applies various image processing thereafter to such image data. Numeral 5 denotes a plotter which is an image recording device which records with a prescribed resolution such image data to which image data processing has been applied as described above and image data received from another facsimile apparatus, and numeral 6 denotes an operational panel for operating the apparatus having various operational keys and display units.

Numeral 7 denotes a compressing and decompressing unit which compresses image data to be transmitted and also decompresses image data which has been received as compressed to the original data. Numeral 8 denotes an image data storing unit for storing such image data read by the scanner 4, image data compressed and image data to be outputted to the plotter 5. Numeral 9 denotes a modem which performs, as an example, as a G3 facsimile modem and is equipped with a low speed modem (e.g., V.21 modem) for performing communications of transmission protocols and a high speed modem (e.g., V.29 modem, V.27ter modem) for transmitting primarily image data. Numeral 10 denotes a network control unit (NCU) for connecting the facsimile apparatus to a public network and which is equipped with an automatic call originating and receiving functions, and numeral 11 denotes a DMA controller for transferring data at a high speed between a peripheral equipment, such as the scanner 4 and the plotter 5, and the image storing device 8 without involving the CPU 11.

The CPU 1, the system memory 2, the parameter memory 3, the scanner 4, the plotter 5, the operational panel 6, the compressing and decompressing unit 7, the image storing unit 8, the modem 9, the network control unit 10 and the DMA controller 11 are connected to a system bus 12 and data exchange among these elements is made through the system bus 12. Data exchange between the modem 9 and the network control unit 10 is made directly between these two elements.

Figure 2:
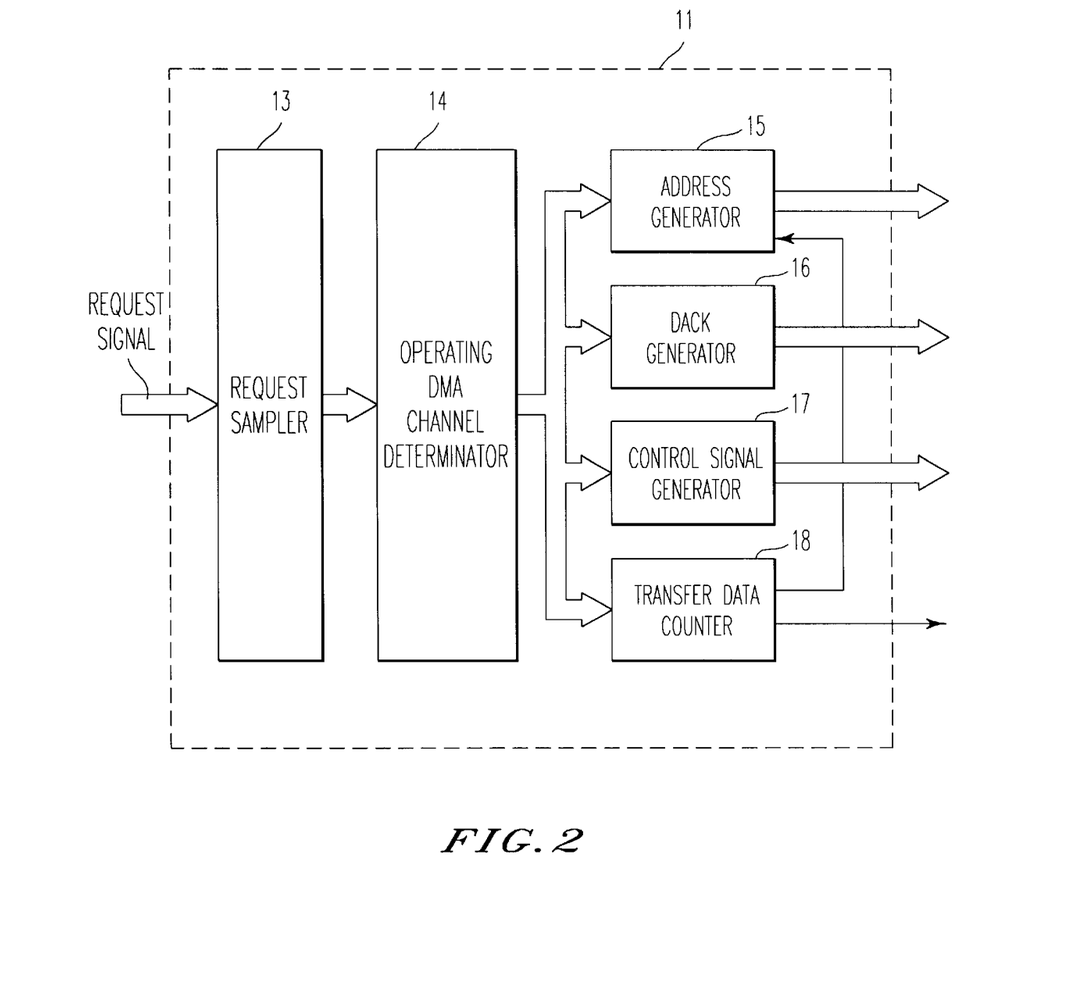
FIG. 2 is a block diagram illustrating an internal structure of a DMA controller employed in the facsimile apparatus illustrated in FIG. 1.

FIG. 2 is a block diagram illustrating an internal structure of the DMA controller 11. In FIG. 2, numeral 13 denotes a request sampler which receives a request signal which indicates a request for a DMA transfer from such peripheral equipment as the scanner 4 and the plotter 5. Numeral 14 denotes an operating DMA channel determinator which determines in accordance with a received request signal a DMA channel to be operated for a DMA transfer in an order of priority which has been prescribed beforehand, and numeral 15 denotes an address generator which generates an address for a DMA transfer in accordance with an operating DMA channel information determined by the operating DMA channel determinator 14. The address generator 15 is a characteristic part of the present invention and will be explained in detail later. Numeral 16 denotes a DACK generator which outputs a DACK signal for allowing the requested DMA transfer to the peripheral equipment from which the request signal has been received and for which the operating DMA channel has been determined. Numeral 17 denotes a control signal generator which generates such control signals necessary for DMA transfer as a memory read/write signal and an I/O read/write signal. Numeral 18 denotes a transfer data counter which counts a number of transferring data and this counter 18 outputs to the CPU 1 a signal indicating a completion of transferring one page (one block of data) and also a signal indicating a completion of transferring one line to the address generator 15.

Figure 3:
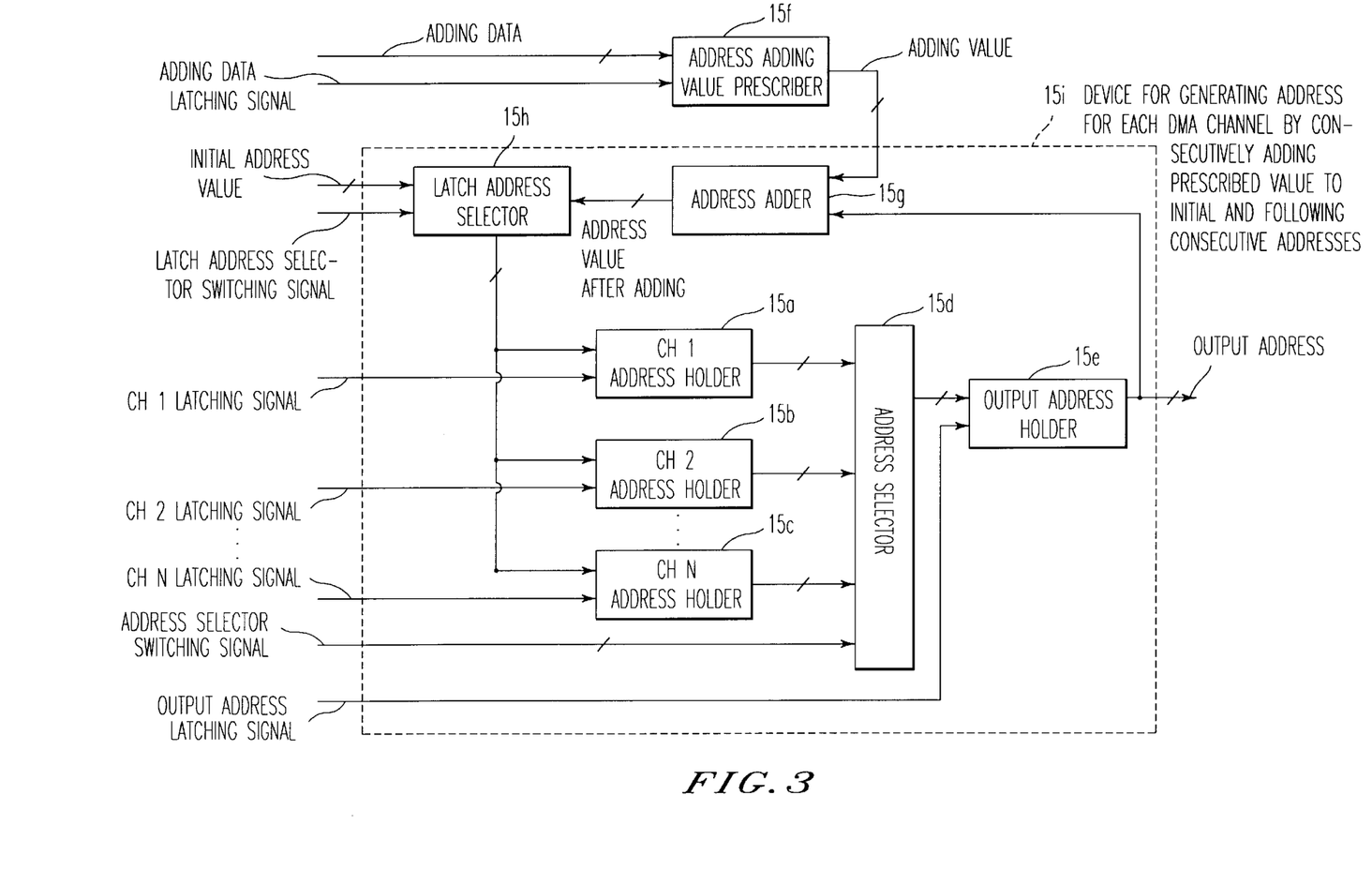
FIG. 3 is a block diagram illustrating an internal structure of an address generator in accordance with the first embodiment of the present invention, which is employed in the DMA controller illustrated in FIG. 2.

FIG. 3 is a block diagram illustrating an internal structure of a first embodiment of the address generator 15. In FIG. 3, numerals 15a, 15b and 15c denote address holders respectively which are provided for each DMA channel (CH 1–CH N). Each address holder 15a–15c for each DMA channel is made of a same number of latch circuits as a number of bits for an address and holds a value inputted thereto with a corresponding latching signal. Numeral 15d denotes an address selector which selects a corresponding address among the address holders 15a, 15b and 15c in accordance with an address selector switching signal indicating the operating DMA channel, and numeral 15e denotes an output address holder which holds an output address from the address selector 15d by an output address latching signal to make it an output address. The output address recorder 15e is made of a same number of latch circuits as a number of bits for an address.

Numeral 15f denotes an address adding value prescriber which is an address adding value prescribing means with which an address adding value can be prescribed at any arbitrary value. Such an address adding value prescriber 15f is made of a same number of latch circuits as a number of bits for an address and an adding data inputted as an address adding value is latched by an adding data latching signal. Numeral 15g denotes an address value adder which adds the adding value which has been prescribed by the address adding value prescriber 15f to an output address from the output address holder 15e. Numeral 15h denotes a latch address selector which selects an address to be latched with the address holders 15a, 15b and 15c.

The latch address selector 15h selects by a latch address selector switching signal an initial address value from the CPU 1 when initializing a DMA transfer, and switches to consecutive address values which are the result of adding the address adding value consecutively and output from the address value adder 15g when a DMA transfer is started. Here, the address holders 15a, 15b and 15c, the address selector 15d, the output address holder 15e, the address adder 15g and the latch address selector 15h constitute a device for generating an address for each DMA channel by consecutively adding an address adding value which has been prescribed beforehand to an initial address value and following consecutive address values, which is denoted by numeral 15i herein.

Figure 4A:
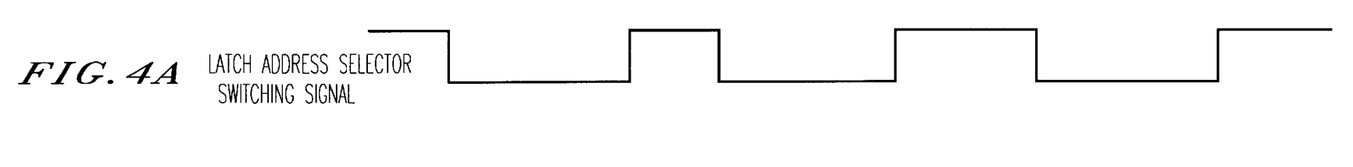
FIGS. 4(a)–4(e) are timing charts illustrating a time sequence of prescribing an initial address with the address generator illustrated in FIG. 3.
Figure 4B:
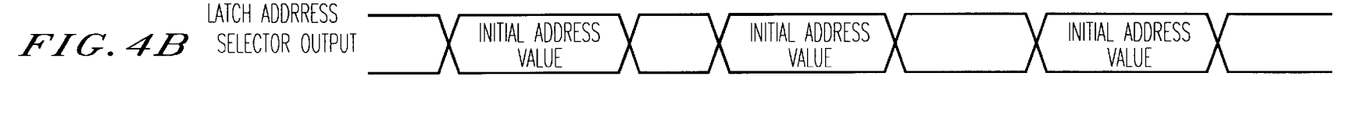
Figure 4C:
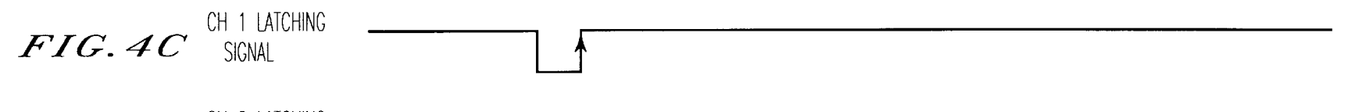
Figure 4D:
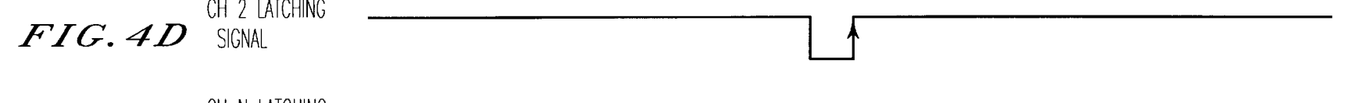
Figure 4E:
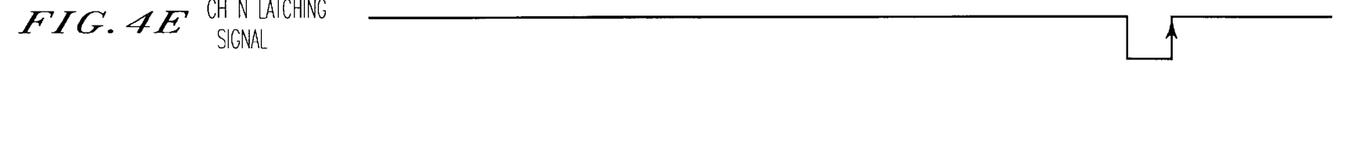

Next, examples of a timing sequence of operations with the above-mentioned construction are explained referring to FIGS. 4(a)–4(e) and 5(a)–5(j). FIGS. 4(a)–4(e) illustrates timing sequences of an operation of prescribing an initial address and FIGS. 5(a)–5(j) illustrates timing sequences of an operation of a DMA transfer. Before a DMA transfer is started, the CPU 1 provides an initial address value for each DMA channel to the latch address selector 15h, and such initial address values are provided to the address holders 15a, 15b and 15c respectively by making the latch address selector switching signal to a logical 'L' level as illustrated in FIG. 4(a). These initial address values are latched in the address holders 15a, 15b and 15c respectively by rising edges of corresponding latching signals, see FIGS. 4(c)–4(e), for CH 1–CH N. Also, the CPU 1 provides to the address adding value prescriber 15f an adding data which is the address adding value to be latched by the adding data latching signal.

Figure 5A:
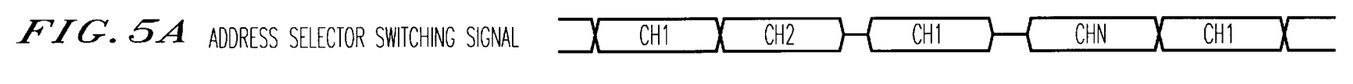
FIGS. 5(a)–5(j) are timing charts illustrating a time sequence of a DMA transfer with the address generator illustrated in FIG. 3.
Figure 5B:
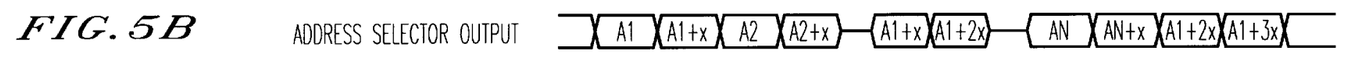
Figure 5C:
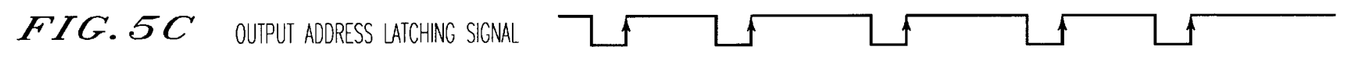
Figure 5D:
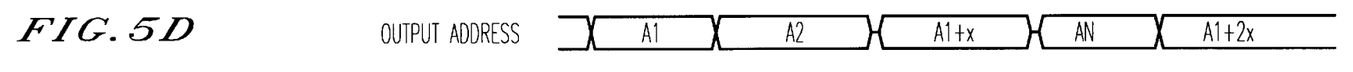
Figure 5E:
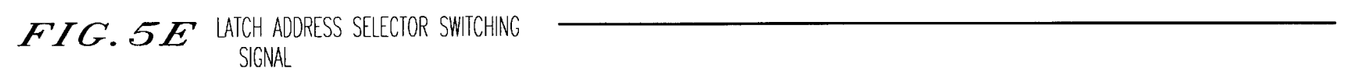
Figure 5F:
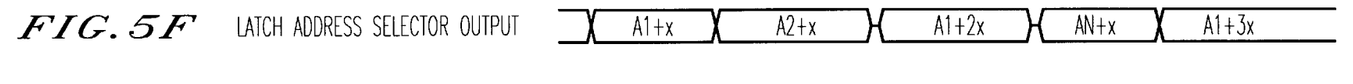
Figure 5G:
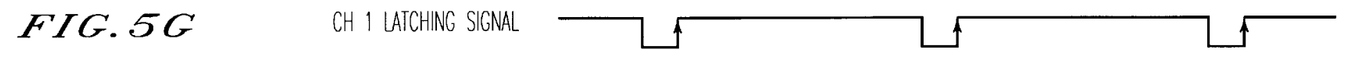
Figure 5H:
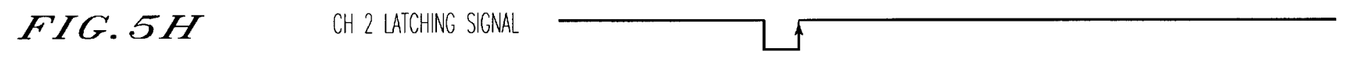
Figure 5I:
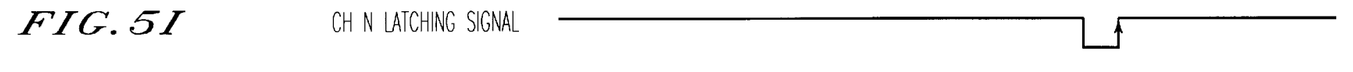
Figure 5J:
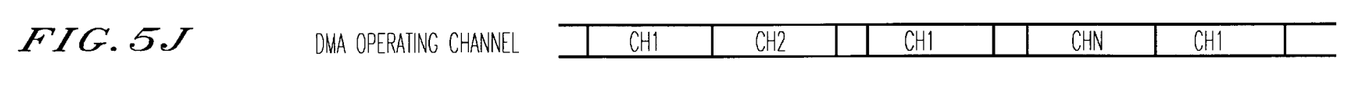

When a DMA transfer is started after initialization, each DMA channel is operated in a time shared mode as illustrated in FIG. 5(j). For example, when DMA channel CH 1 is in operation, the address selector 15d selects in accordance with the address selector switching signal an output from the address holder 15a which is for channel CH 1. The address is latched in the output address holder 15e by the rising edge of the output address latching signal of FIG. 5(c) and is outputted to the image storing unit 8. This output address value is added by the address adder 15g to the adding value x which is prescribed at the address adding value prescriber 15f by the CPU 1 and is outputted to the latch address selector 15h. Since the latch address selector switching signal of FIG. 5(e) which controls the latch address selector 15h is at a logical 'H' level while a DMA transfer is in operation, the address values produced after the adding value x is added to the output address value are provided to the address holders 15a, 15b and 15c respectively through the latch address selector 15h. The address is then latched in the address holder 15a which is for channel CH 1 by the rising edge of the CH 1 latching signal of FIG. 5(g). Supposing the initial address value for the channel CH 1 is A1, such an address as A1+x is outputted from the address selector 15d. Channels 2–N are similarly operated in the time shared mode.

Figure 10:
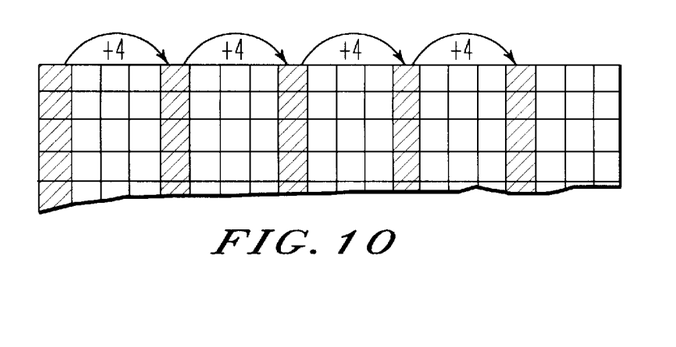
FIG. 10 is a diagram explaining an example of skipping over data at a certain interval in a primary scanning direction.

FIG. 10 illustrates an example of skipping over every three data elements in a primary scanning direction by prescribing the address adding value at 4. Since such an address adding value can be prescribed at any value, it is possible in DMA transferring image data for one page as one block to skip over data at any interval in the primary scanning direction without involving the CPU 1. Further, in a case that image data for one page are stored in the image memory unit 8 in a consecutive order of the primary scanning direction and are needed to be transferred to the sub-scanning direction in units of one word (byte) for the purpose of rotating the image, it is necessary to add a value corresponding to the number of words (bytes) in the primary scanning direction, which it is possible to accomplish with the above-mentioned embodiment.

Figure 6:
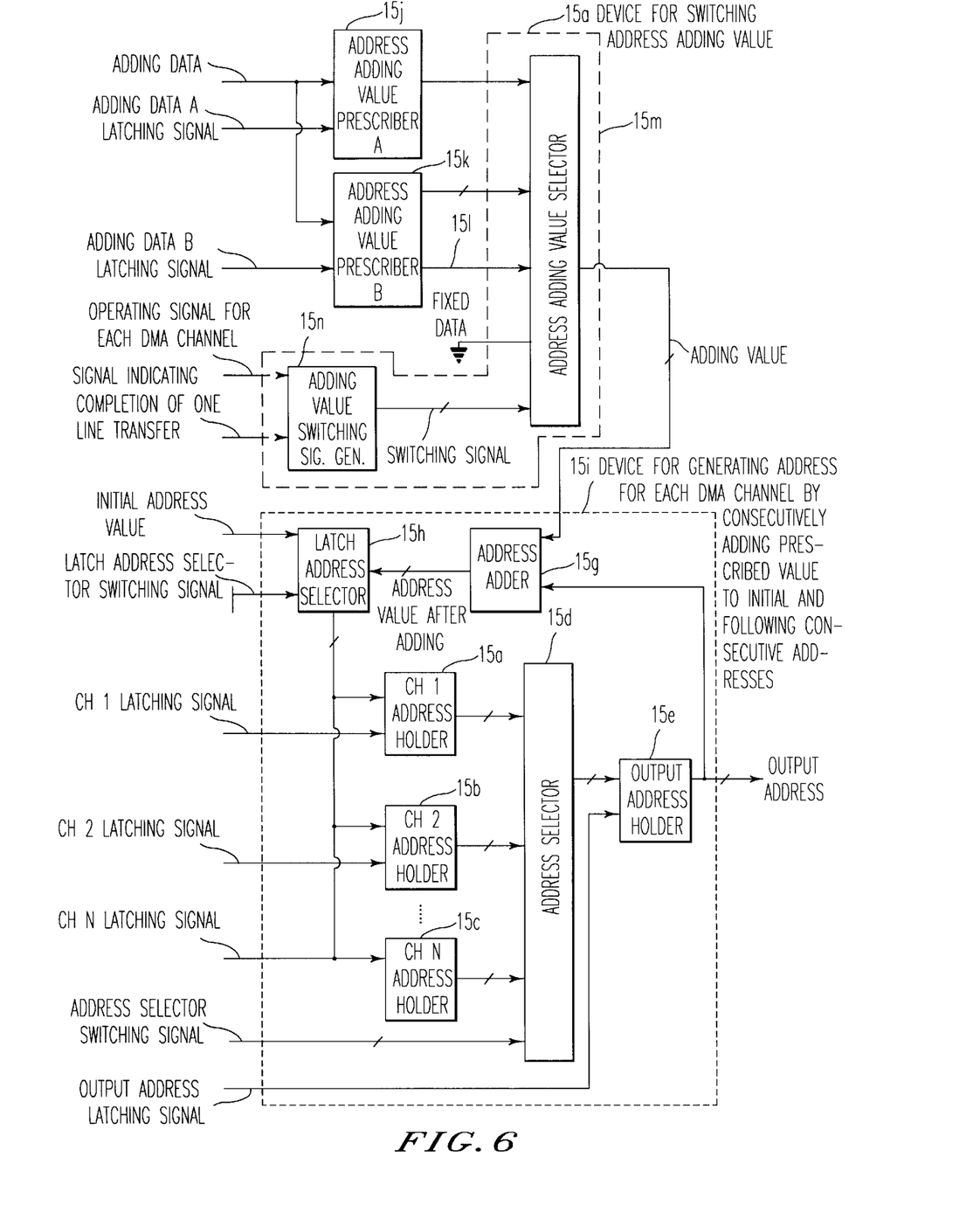
FIG. 6 is a block diagram illustrating an internal structure of an address generator in accordance with a second embodiment of the present invention.
Figure 7A:
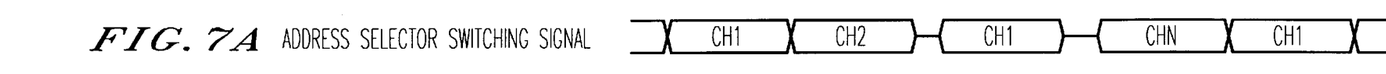
FIGS. 7(a)–7(k) are a timing charts illustrating a time sequence of a DMA transfer with the address generator illustrated in FIG. 6.
Figure 7B:
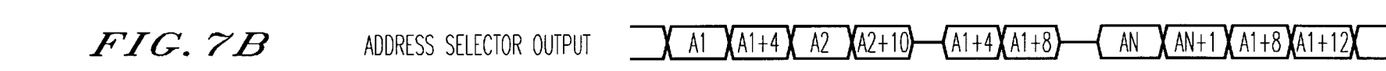
Figure 7C:
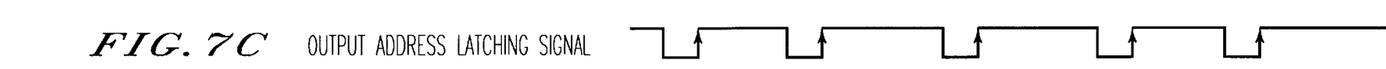
Figure 7D:
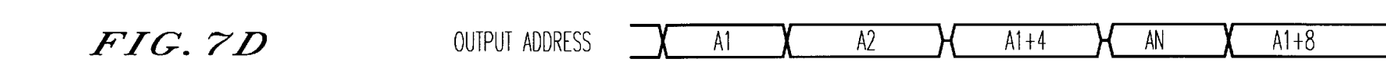
Figures 7E, 7F:
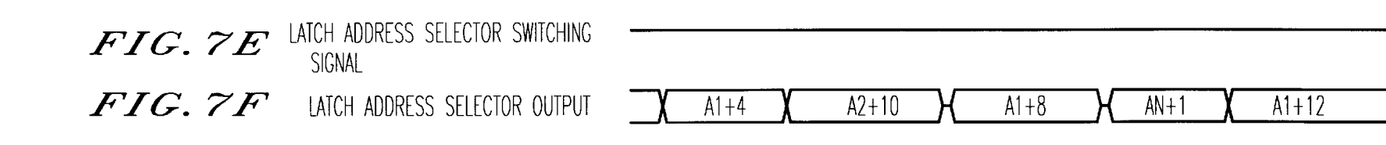
Figure 7G:
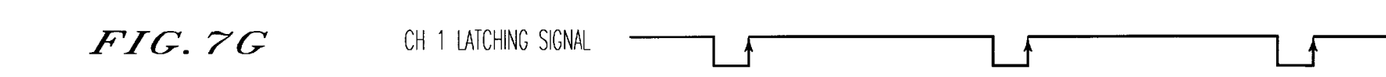
Figure 7H:
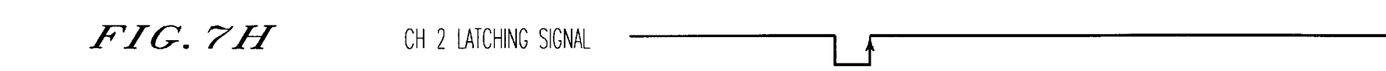
Figure 7I:
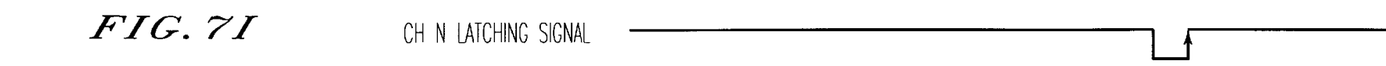
Figure 7J:
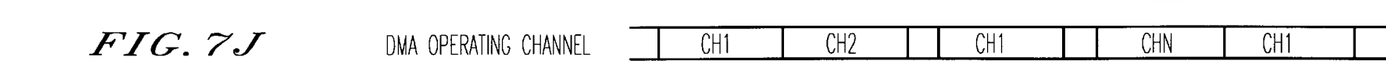
Figure 7K:
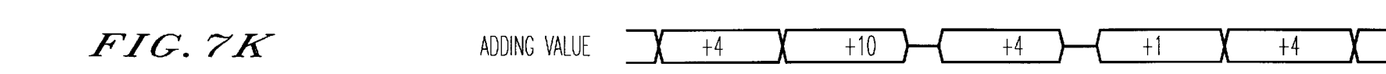

FIG. 6 is a block diagram illustrating an internal structure of a second embodiment of the address generator 15. In FIG. 6, the same numerals as in the previous FIG. 3 designate identical or corresponding parts. Numerals 15j and 15k denote address adding value prescribers A and B respectively as in the previous embodiment and these address adding values prescribers 15j and 15k can prescribe an address adding value at any arbitrary value respectively by latching an adding data from the CPU 1 with a corresponding adding data A latching signal or an adding data B latching signal. Numeral 15l denotes a fixed value prescriber which prescribes a fixed value such as +1 by inputting a value between a power source and ground. Numeral 15m denotes an address adding value selector which selects an address adding value to be provided to the address adder 15g from the adding values prescribed at the address adding value prescribers 15i and 15k and the fixed value prescribed at the fixed value prescriber 15*l*. Numeral 15*n* denotes an adding value switching signal generator which generates a switching signal for controlling the address adding value selector 15*m*. This adding value switching signal generator 15*n* generates switching signals in accordance with an operating signal for each DMA channel from the operating channel determinator 14 and a signal indicating a completion of transferring one line from the transfer data counter 18, both shown in FIG. 2. The address adding value selector 15*m* and the adding value switching signal generator 15*n* constitute a device for switching an address adding value, which is denoted as 15*o* in FIG. 6.

Figure 8:
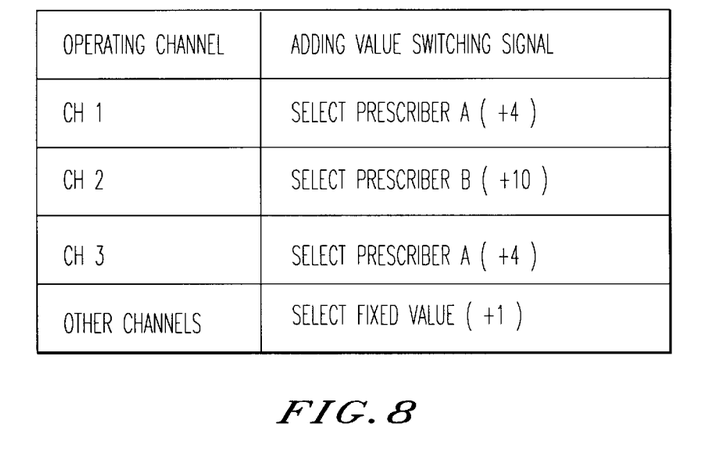
FIG. 8 is a diagram illustrating an address adding value switching signal for each operating DMA channel in accordance with the second embodiment of the present invention.

FIGS. 7(*a*)–7(*k*) are timing sequences illustrating an operation when +4 is prescribed at the address adding value prescriber A 15*j* and +10 at the address adding prescriber B 15*k*, and +4 is desired for DMA channels CH 1 and CH 3, +10 is desired for DMA channel CH 2 and +1 is desired for the other DMA channels. The basic operation illustrated in FIGS. 7(*a*)–7(*k*) is the same as the one of the previous embodiment shown in FIGS. 5(*a*)–5(*j*) and the only difference is in that the adding value is switched in this embodiment of FIGS. 7(*a*)–7(*k*). Namely, a switching signal is generated from the adding value switching signal generator 15*n* so that the address adding value selector 15*m* selects an output from the address adding value prescriber A 15*j* when DMA channels CH 1 or CH 3 are operated, an output from the address adding value prescriber B 15*k* when DMA channel CH 2 is operated and the fixed value when the other DMA channels are operated (refer to FIGS. 7(*a*)–7(*k*) and FIG. 8).

Figure 9:
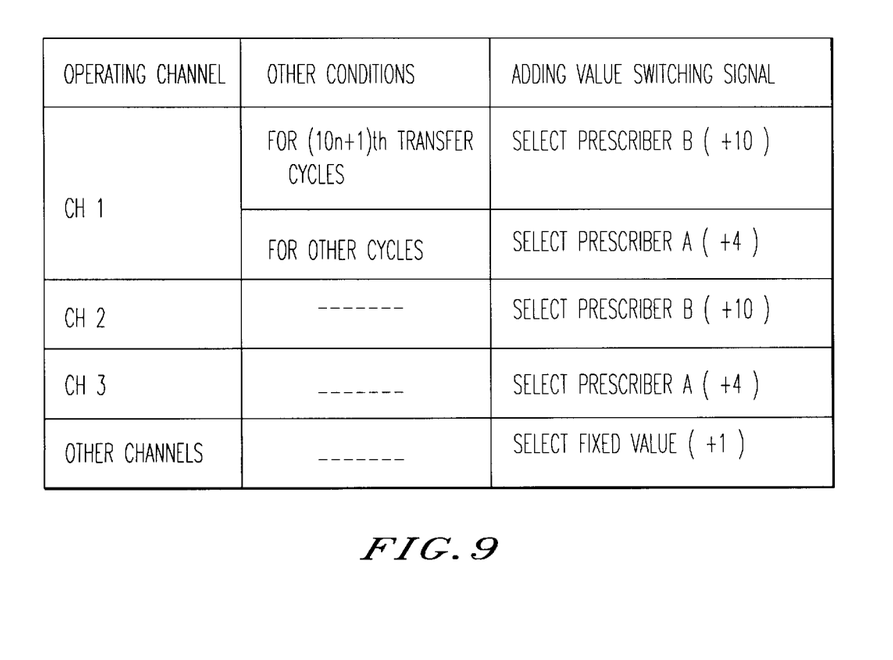
FIG. 9 is a diagram illustrating another example of an address adding value switching signal for each operating DMA channel in accordance with the second embodiment of the present invention.

Further, in a case that +10 is prescribed for every (10*n* +1)th transfer cycle, such as the 11th, 21st, 31st and 41st transfer cycles, and +4 is prescribed for other transfer cycles for DMA channel CH 1, the other channel being the same as described before, adding value switching signals as illustrated in FIG. 9 are generated from the adding value switching signal generator 15*n*.

Figure 11:
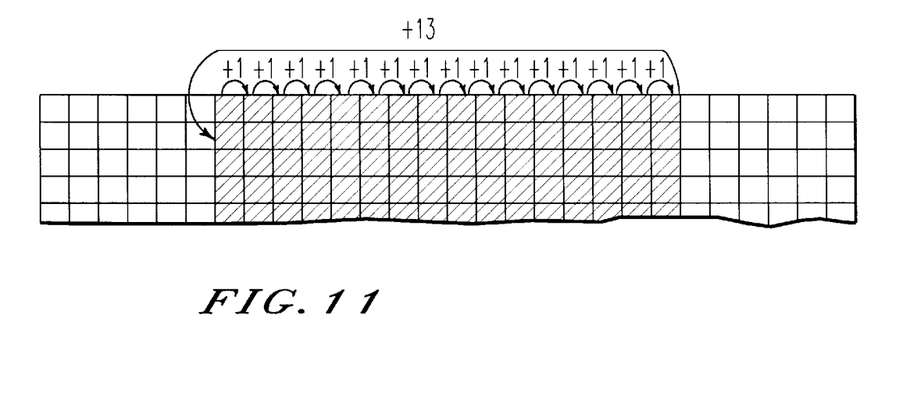
FIG. 11 is a diagram explaining an example of extracting data for a smaller size from an original data.
Figure 12:
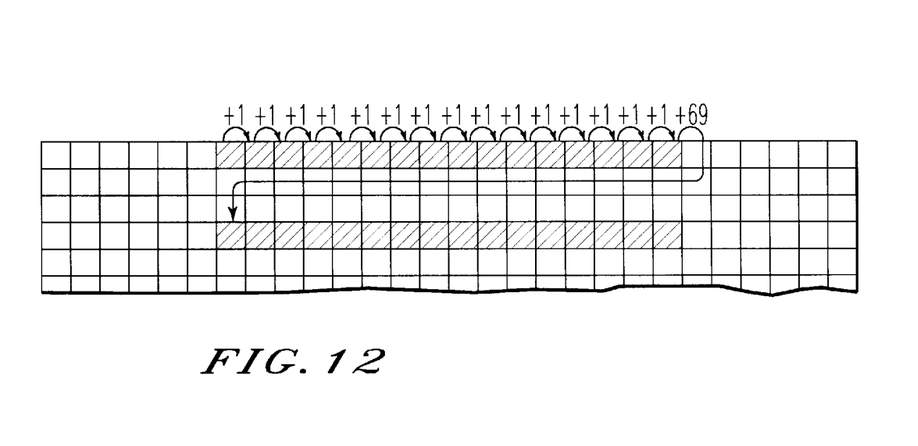
FIG. 12 is a diagram explaining an example of skipping over data at a certain interval in a sub-scanning direction.

As described above, according to this embodiment of the present invention, it becomes possible in DMA transferring image data for one page as one block to extract a smaller portion from the original data as illustrated in FIG. 11 and further to skip over data at a certain interval in a sub-scanning direction as illustrated in FIG. 12 by combining such fixed adding value as +1 with arbitrary adding values. Also, by a combination of different arbitrary adding values, it is possible to skip over data in both primary and sub-scanning directions or skip data at different intervals between a DMA channel from the scanner 4 to the image storing unit 8 and a DMA channel from the image storing unit 8 to the plotter 5.

While the presently preferred embodiments of the present invention have been shown and described as above, it is to be understood that this disclosure is for the purpose of illustration and that various changes and modifications may be made without departing from the scope of the inventions as set forth herein. Particularly, while the embodiments of a DMA controller according to the present invention have been described as adapted to a facsimile apparatus, it is to be understood that the DMA controller according to the present invention may be adapted to any image processing apparatus which processes image data such as a digital copier and so forth.

As described above, a DMA controller according to the present invention is provided with a device for generating addresses for each DMA channel by consecutively adding a value which has been prescribed beforehand to an initial address value and following consecutive address values and a device for prescribing such address adding values. Therefore, it becomes possible with the DMA controller according to the present invention to skip data at a certain interval in a primary scanning direction when DMA transferring one page of image data by prescribing an arbitrary value at the address adding value prescribing device.

The DMA controller according to the present invention as mentioned above is further provided with a device for switching the address adding value between a fixed adding value prescribed beforehand and a value prescribed by the address adding value prescribing device. Therefore, it becomes possible, for example, to extract a portion corresponding to a B4 width from an A3 width image data when transmitting with the DMA controller according to the present invention by switching the address adding value between a fixed value normally used, such as 1, and a value prescribed by the address adding value prescribing device. It is also possible to skip data at a certain interval in a sub-scanning direction.

In a case that plural devices for prescribing such address adding values are provided with the DMA controller mentioned above, the address adding value switching device switches among such plural devices for selecting the address adding value according to the present invention. Therefore, it becomes possible to select for each DMA transfer an appropriate address adding value depending upon the sizes of a transmitting image and a printing paper by prescribing an arbitrary value at each address adding value prescribing device and switching the address adding value among such values. It is also possible to skip data at a certain interval in both primary scanning and sub-scanning directions.

Further, the address adding value switching device as mentioned above is so made to perform such switching of the address adding value for each operating DMA channel. Therefore, it is possible to operate a DMA channel for decompressing an image data and a DMA channel for transferring such decompressed image data to another location at the same time with different adding values with the DMA controller according to the present invention.

Further, the address adding value switching device as mentioned above is so made to perform such switching of the address adding value every time when a transfer of a certain volume of data is completed. Therefore, it becomes possible with the DMA controller according to the present invention to extract a portion corresponding to a B4 width from an A3 width image data when transferring data. It is also possible to skip data at a certain interval in both primary scanning and sub-scanning directions.

Further, a facsimile apparatus according to the present invention which is equipped with a DMA controller for controlling a DMA transfer of image data between a peripheral equipment and a storage device without involving a CPU is provided with a device for generating addresses for each DMA channel by consecutively adding a value which has been prescribed beforehand to an initial address value and following consecutive addresses, a device for prescribing such address adding value at some value and a device for switching the address adding value between such a fixed value prescribed beforehand and a value prescribed by such an address adding value prescribing device, so that image data for one page can be DMA transferred as one block. Therefore, it becomes possible with the facsimile apparatus equipped with the DMA controller according to the present invention to perform a DMA transfer of one page of image data without increasing a burden on a CPU.

Obviously, numerous additional modifications and variations of the present invention are possible in light of the above teachings. It is therefore to be understood that within the scope of the appended claims, the present invention may be practiced otherwise than as specifically described herein.

What is claimed as new and desired to be secured by Letters Patent of the United States is:

1. A DMA controller which controls a DMA transfer for a plurality of DMA channels of image data between a peripheral equipment and a storage device without involving a central processing unit, comprising:

address generating means for generating addresses for each DMA channel by adding consecutively an address adding value prescribed beforehand to an initial address value and following consecutive address values, wherein the address generating means includes a respective address holding means for each DMA channel and an address selecting means for selecting one of said address holding means; and address adding value prescribing means for prescribing said address adding value at an arbitrary value.

2. The DMA controller according to claim 1, further comprising address adding value switching means for switching said address adding value between the fixed adding value prescribed beforehand and the arbitrary value prescribed by said address adding value prescribing means.

3. The DMA controller according to claim 2, wherein said address adding value prescribing means are plural in number and said address adding value switching means switches said address adding value among those prescribed by said plural address adding value prescribing means.

4. The DMA controller according to claim 2, wherein said address adding value switching means switches said address adding value for each DMA channel.

5. The DMA controller according to claim 2, wherein said address adding value switching means switches said address adding value every time a transfer of a predetermined volume of data is completed.

6. An image processing system which is equipped with a DMA controller which controls a DMA transfer for a plurality of DMA channels of image data between a peripheral equipment and a storage device without involving a central processing unit, comprising:

address generating means for generating addresses for each DMA channel by consecutively adding a fixed address adding value prescribed beforehand to an initial address value and following consecutive address values, wherein the address generating means includes a respective address holding means for each DMA channel and an address selecting means for selecting one of said address holding means;

address adding value prescribing means for prescribing said address adding value at an arbitrary value; and address adding value switching means for switching said address adding value between the fixed adding value prescribed beforehand and the arbitrary adding value prescribed by said address adding value prescribing means.

7. The image processing system according to claim 6, wherein image data for one page constitutes one block of data for the DMA transfer.

8. The image processing system according to claim 7, wherein said image processing system is a facsimile apparatus.

9. The image processing system according to claim 7, wherein said image processing system is a digital copying machine.

10. A DMA controller which controls a DMA transfer for a plurality of DMA channels of image data between a peripheral equipment and a storage device, comprising:

an address generator generating addresses for each DMA channel by adding consecutively an address adding value to an initial address value and following consecutive address values, wherein the address generator includes a respective address holder for each DMA channel and an address selector selecting one of said address holder; and a first address adding value prescriber prescribing said address adding value at a first arbitrary value.

11. The DMA controller according to claim 10, further comprising an address adding value switch switching said address adding value between a predetermined fixed adding value and the arbitrary value prescribed by said first address adding value prescriber.

12. The DMA controller according to claim 11, further comprising a second address adding value prescriber prescribing said address adding value at a second arbitrary value, and said address adding value switch switching said address adding value between the first and second arbitrary values prescribed by said respective first and second address adding value prescribers.

13. The DMA controller according to claim 11, wherein said address adding value switch switches said address adding value for each DMA channel.

14. The DMA controller according to claim 11, wherein said address adding value switch switches said address adding value every time a transfer of a predetermined volume of data is completed.

15. The image processing system according to claim 10, wherein image data for one page constitutes one block of data for the DMA transfer.

16. The image processing system according to claim 15, wherein said image processing system is a facsimile apparatus.

17. The image processing system according to claim 15, wherein said image processing system is a digital copying machine.

* * * * *